United States Patent [19]

Macosko et al.

[11] 4,189,070
[45] Feb. 19, 1980

[54] REACTION INJECTION MOLDING MACHINE

[75] Inventors: Christopher W. Macosko, Minneapolis, Minn.; Ly J. Lee, Akron, Ohio

[73] Assignee: The Regents of the University of Minnesota, Minneapolis, Minn.

[21] Appl. No.: 874,798

[22] Filed: Feb. 3, 1978

[51] Int. Cl.$^2$ ............................................. B67D 5/46
[52] U.S. Cl. .................................... 222/134; 222/135; 222/309; 417/398; 417/429; 92/13.3
[58] Field of Search .................. 92/13.3, 13.5, 13.7; 417/426, 429, 398; 222/134, 135, 144.5, 145, 334, 309, 288; 123/48 B, 78 E, 78 F

[56] References Cited

U.S. PATENT DOCUMENTS

| | | | |
|---|---|---|---|
| 2,548,807 | 4/1951 | Morgan et al. | 92/13.7 X |
| 3,231,148 | 1/1966 | Miller | 222/288 |
| 3,499,387 | 3/1970 | Zippel | 92/13.5 |
| 3,642,175 | 2/1972 | Robbins | 222/135 |
| 3,664,551 | 5/1972 | Ferrari | 222/134 |
| 3,737,073 | 6/1973 | Lupert | 222/134 |
| 4,043,486 | 8/1977 | Wisbey | 222/134 |

Primary Examiner—David A. Scherbel
Attorney, Agent, or Firm—Burd, Bartz & Gutenkauf

[57] ABSTRACT

A machine for metering and mixing two or more liquids, which are rapidly reactive to form a solid polymer, immediately prior to the injection of the liquids into a molding machine. The machine is characterized by two or more metering cylinders into which the liquid reactants are introduced from supply sources and ejected in stoichiometric ratio into a mixing head for injection into a molding machine. The machine is capable of both incremental and continuous variation of stoichiometric ratio. The first is achieved by provision of removable cylindrical liner sleeves of varying inside diameter and corresponding pistons for the mixing cylinders. The latter is achieved through the use of a movable fulcrum lever arm to control the stroke of the piston of at least one of the metering cylinders. The mixer head is characterized by a mixing chamber, a plurality of impingement jet nozzles oppositely spaced and the flow from which is characterized by Reynolds numbers exceeding about 120.

10 Claims, 7 Drawing Figures

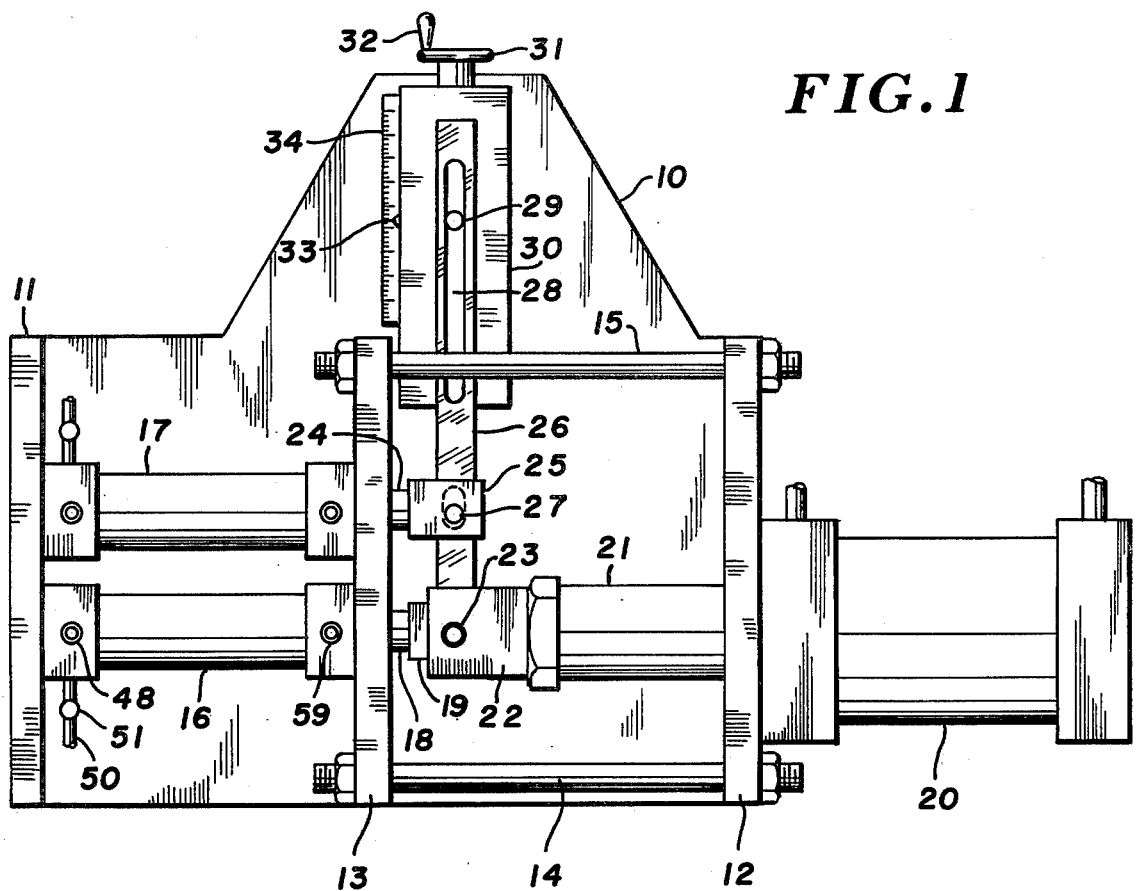
FIG. 1
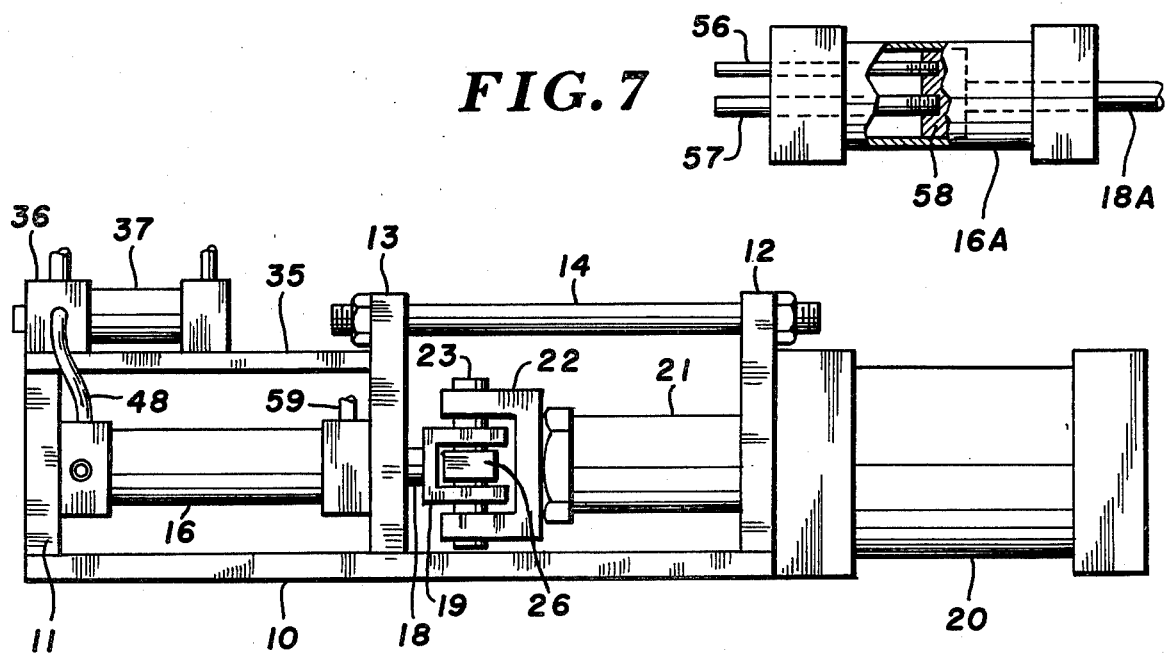
FIG. 7
FIG. 2

REACTION INJECTION MOLDING MACHINE

The Government has rights in this invention pursuant to Grant Number DMR75-04508 awarded by the National Science Foundation.

BACKGROUND OF THE INVENTION

1. Field of the Invention

This invention is directed to a machine for accurately metering two or more liquids, which are reactive to rapidly form a polymer, in precise stoichiometric proportions and then intimately and thoroughly admixing the liquids to initiate the polymer forming reaction, and injecting the reacting mixture into a mold.

Recently, polymer chemists have developed polymerization systems that proceed rapidly to completion in the bulk state, i.e., less than one minute. The most important of these are the fast urethane polymerizations, but other systems such as silicone rubber, nylon and polyesters can also be rapidly polymerized in bulk. In order to polymerize completely to high molecular weight, the monomers or pre-polymers involved must be rapidly and completely mixed in precisely correct stoichiometric proportions.

The potential advantages of forming objects by injection molding using such fast polymerizing systems are great. The mold can be filled rapidly and at low pressure because the monomers involved are of low viscosity. The final polymer forms in the mold. Great savings in capital, equipment and in energy can be realized from the use of equipment to automatically meter, mix and inject the reactive liquids. Heavy molds, high clamp force, and large injection units are no longer necessary.

2. The Prior Art

The use of fast polymerizing systems in injection molding is called "reaction injection molding" or "RIM". All practical RIM machines use impingement mixing in which two or more reactant streams collide in a chamber. To prevent plugging, the chamber is cylindrical and wiped clean after each shot with a closely fitting ram. The flow rate through the mixing head must be high to get good mixing. Such flow rates are generally sufficient to fill molds rapidly with the low viscosity reactants. Mixing units with moving impellers or complex internal structures are generally undesirable because they tend to become plugged with polymer due to the fast reaction.

The principal differences in prior RIM machines is in the metering system and to some extent the type of mix head. A continuous pump type of machine uses positive displacement piston pumps to meter reactants. Such machines are expensive, present serious maintenance problems, and are prone to failure. Because the pumps do not respond rapidly enough, they may deliver materials off-ratio at the beginning of the shot.

Other machines use two hydraulic cylinders to meter the reactive components. These are mechanically simpler than pump type machines but require some means of altering and then maintaining stoichiometric ratio between the two cylinders. One method is to have the cylinders facing in opposite directions and drive an adjustable wedge between them. This simple approach suffers from long connecting lines and large bending moments which can jam the pistons of the cylinders and wear the seals. Another approach is to control metering with a sophisticated servo feed back system on two power cylinders. This equipment is also expensive.

Another machine employs an accumulator system and gear pumps but does not appear to be capable of accurate metering.

A variety of mix heads have also been proposed. One type of machine uses a complex impingement mix head patterned after a diesel engine fuel injector, similar to that of Fries U.S. Pat. No. 3,936,036. Another head uses slits for the impinging streams rather than circular orifices. The slit design allows the wiper to uncover any portion of the slit permitting easy changing of fluid velocity. See, for example, Wisbey U.S. Pat. No. 4,043,486.

SUMMARY OF THE INVENTION

The present invention is directed to a machine of simple and modular construction to allow a wide range of sizes at relatively low cost and capable of accurate metering and thorough mixing over a wide range of stoichiometric ratios. The machine includes a plurality of storage vessels for separately containing reactive liquids. A corresponding plurality of reactant metering cylinders are provided, each connected by appropriate passages to one of the liquid storage vessels. Each cylinder includes a reciprocable piston. Power means are provided for reciprocating the pistons of all of the cylinders together. One example of such power means is a fluid actuated power cylinder disposed in longitudinal alignment with one of the metering cylinders with the piston of the metering cylinder being connected to the piston of the power cylinder. A lever arm is connected at one end to the piston of the first metering cylinder. The lever arm pivotally engages a movable fulcrum, in a slotted connection, at a point spaced from its connection to the first metering cylinder piston. The lever arm also pivotally engages the piston of the other metering cylinder in a slotted connection. Each metering cylinder in turn is connected by appropriate passages to a mixing head, from which the reactive mixture is injected into a molding machine.

Continuous ratio control of the reactants is provided by variation in positioning of the movable fulcrum for the lever arm controlling one of the metering cylinders. Coarse incremental changes in ratio can be achieved by changing the cylinder diameter by means of removable sleeves, or by addings rods on the reactant fluid side of the cylinder.

BRIEF DESCRIPTION OF THE DRAWINGS

The invention is illustrated by the accompanying drawings in which corresponding parts are identified by the same numerals and in which:

FIG. 1 is a top plan view of the machine according to the present invention, shown with the mixing head and ram removed for clarity;

FIG. 2 is a side elevation of the machine;

FIG. 7 is a schematic side elevation, partly in section, of a cylinder with removable rods.

DETAILED DESCRIPTION OF THE PREFERRED EMBODIMENT

Figure 3:
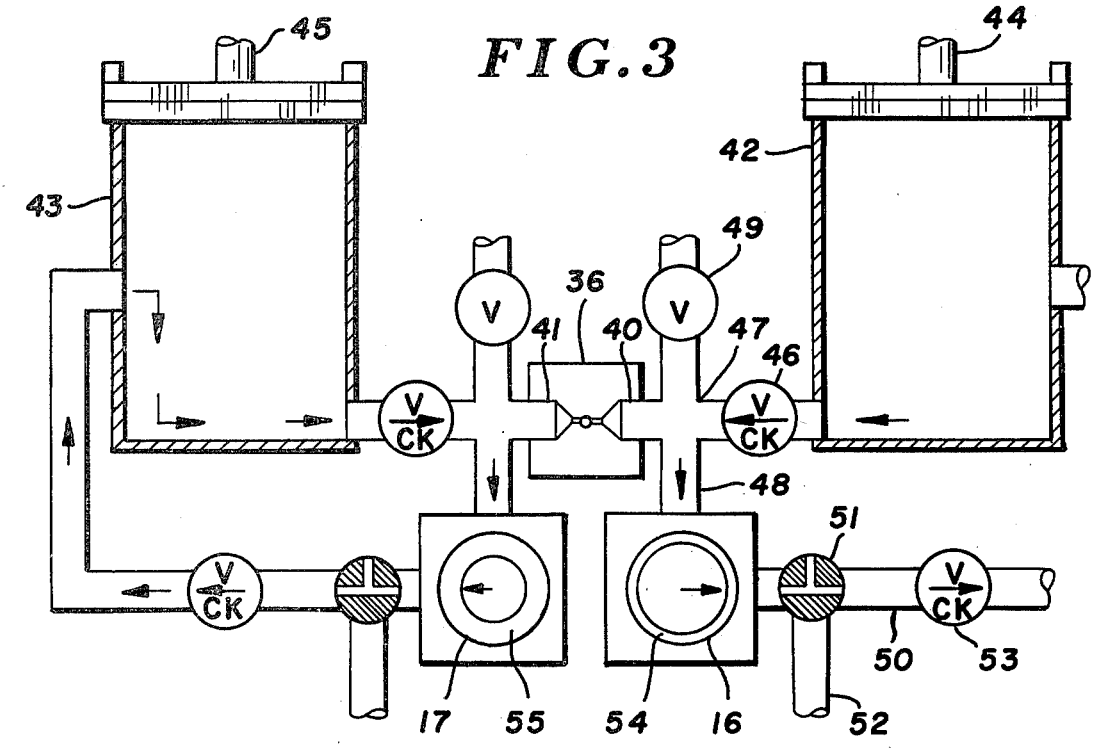
FIG. 3 is a schematic front elevation showing the functional arrangement of the parts of the machine.

Referring now to the drawings and particularly to FIGS. 1, 2 and 3, the reaction injection molding machine includes a frame comprising a horizontal base plate 10 having a plurality of parallel spaced apart vertical plates extending upwardly therefrom, a front plate 11, a rear plate 12, and an intermediate plate 13. For stability the upper ends of plates 12 and 13 are secured together on threaded rods 14 and 15. A pair of hydraulic-type reactant cylinders 16 and 17 are mounted between plates 11 and 13.

Cylinder 16 is usually intended to receive and dispense the higher viscosity of the reactants to be polymerized. The piston rod 18 of cylinder 16 is fitted with a clevis 19 for connection to the driving power force. A power cylinder 20, adapted to be driven by gas or liquid, is mounted on vertical plate 12 in longitudinal axial alignment with cylinder 16. The piston rod 21 of cylinder 20 is provided with a clevis 22. The piston rods of cylinders 20 and 16 are connected by virtue of pin 23 extending through clevis 19 and 22. As power cylinder 20 is energized to retract piston rod 21, piston rod 18 is pulled outwardly from cylinder 16 as hereinafter more fully explained. As the piston of cylinder 16 is withdrawn, the suction created draws the higher viscosity liquid reactant from a storage vessel into the cylinder. As the power cylinder 20 is energized to extend piston rod 21, the reactant material is expelled from cylinder 16. Although a power cylinder is a preferred means for driving the piston of cylinder 16, equivalent means (such as a cam, or a screw drive, or the like) may be used.

The piston rod 24 of cylinder 17, intended usually to receive and dispense a lower viscosity liquid reactant, is provided with a clevis 25. Piston rod 24 is driven as a result of connection to the power cylinder through an elongated lever arm 26. Lever arm 26 is embraced within the arms of clevis 25 intermediate the ends of the arm and connected thereto by virtue of pin 27 extending through the arms of the clevis and a short slot in the lever arm. One end of lever arm 26 is embraced between the arms of clevis 19 of cylinder 16 and connected thereto and to the power cylinder by virtue of pin 23. The opposite end of lever arm 26 is provided with an elongated slot 28 which engages a movable fulcrum pin 29.

Fulcrum pin 29 is movable by virtue of being fixedly supported on a slidable plate 30 which in turn is preferably mounted on a worm gear or screw 31 for movement by means of handle 32 along a line perpendicular to the longitudinal axes of the cylinders. The stoichiometric ratio of reactants introduced into the cylinders 16 and 17 is controlled by the position of the movable fulcrum 29 which can be adjusted continuously by slide 30.

Figure 6:
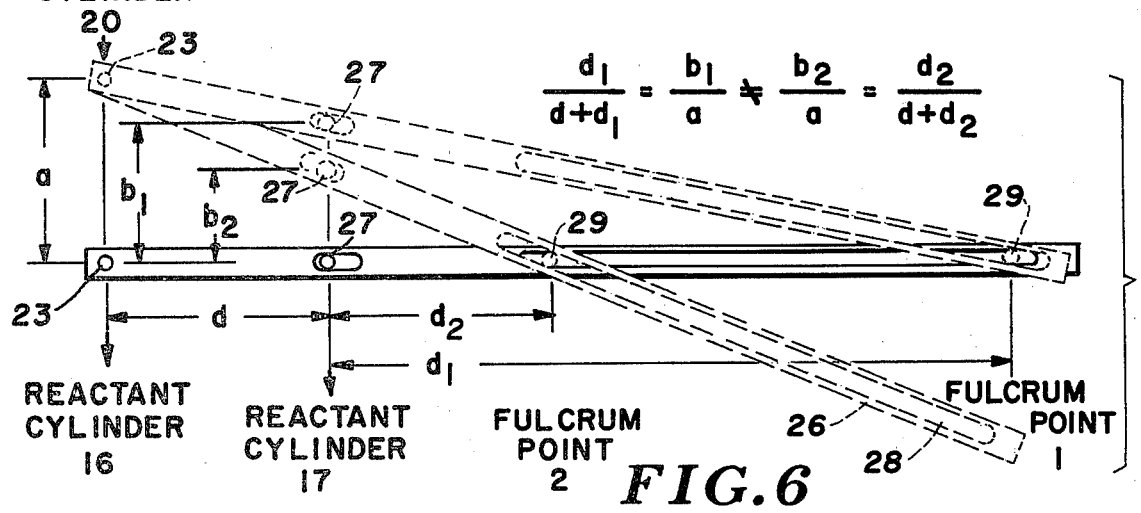
FIG. 6 is a diagrammatic representation of the varying cylinder stroke accomplished by use of a movable fulcrum.

The effect of movement of the fulcrum point on the length of the stroke of the pistons of the cylinders containing the reactant liquids is shown in FIG. 6. In that diagram, "a" represents the stroke of the piston of cylinder 16, which remains constant; "d" is the distance between pins 23 and 27 of the pistons of cylinders 16 and 17 in the forwardmost position; "$d_1$" is the distance between pin 27 and fulcrum position 1; and "$d_2$" is the distance between pin 27 and fulcrum position 2. The stroke of the piston of cylinder 17 when the fulcrum point 29 is in position 1 is represented by "$b_1$". When the fulcrum point 29 is moved to position 2, the resultant much shorter stroke is represented as "$b_2$". While cylinders 16 and 17 need not be of the same size, their volumes are known. From this the length of the stroke necessary to meter the reactants in their precise stoichiometric ratio can be determined. From this the location of the movable fulcrum to produce that stroke can be determined. Desirably, for a given machine, the slide plate is provided with an indicator 33 for use in conjunction with an index scale 34 setting forth the range of stoichiometric ratios.

Figure 4:
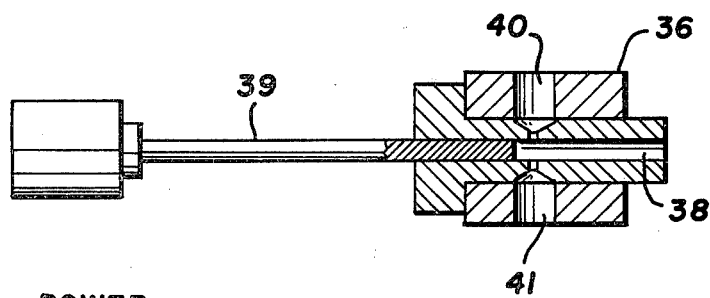
FIG. 4 is a side elevation in section of one form of mixing head.
Figure 5:
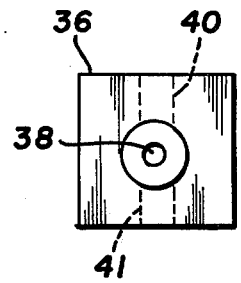
FIG. 5 is a front elevation thereof.

A further horizontal plate 35 is supported by vertical plates 11 and 13 overlying pistons 16 and 17 (FIG. 2). A mixing head 36 and a small fluid power cylinder 37 driving a mix head ram are mounted on plate 35. The mixing head 36 includes a mixing chamber 38 (FIG. 4) in the form of a longitudinal passage. A closely fitting ram 39 driven by cylinder 37 is reciprocable in the passageway 38 to clear it of reactants and to seal off nozzles 40 and 41. A plurality of impingement nozzle openings 40 and 41 extend into the passageway 38. As best seen in FIG. 3, the nozzle openings 40 and 41 are connected by means of appropriate conduits, in the form of tubes or passages, to the cylinders 16 and 17 and to supply vessels 42 and 43.

The reactant supply vessels are mounted in proximity to the metering cylinders 16 and 17. Dependent upon the particular reactants, the supply vessels may be fitted with heating elements, stirrers, and the like, and preferably are provided with duct means 44 and 45, respectively, for connection to a source of nitrogen or other inert gas under pressure. Cylinders 16 and 17 may likewise be fitted with band heaters or similar heating means, dependent upon the particular reactants.

Supply vessel 42 is connected through a check valve 46 to a four-way pipe fitting 47. Fitting 47 is connected in turn to cylinder 16 (as by tube 48, FIG. 3) and to nozzle jet 40. The four-way fitting 47 may also be connected through valve 49 to a thermocouple to measure reactant temperature, or to a pressure transducer to measure the pressure change during the operation of the machine, or to scaled syringes into which the reactants can be shot to check the reactant ratios. With valve 49 closed and with ram 39 closing the nozzle openings, it will be seen that upon the backward stroke of the piston of cylinder 16, reactant from tank 42 will be drawn through check valve 46 into the cylinder in measured amount. Upon reversing the stroke of cylinder 16 and withdrawing ram 39 so as to open the jet nozzle ports, the measured amount of reactant from cylinder 16 is expelled into the mixer head completely or in a series of increments controlled by actuation of cylinder 20.

Reactant cylinder 16 is preferably also connected to reactant tank 42 through a tube or other passage 50 fitted with a threeway valve 51, which is also connected to a purge tube 52. Passage 50 is fitted with a check valve 53. Then, with valve 49 closed and with mix head ram 39 closing the nozzle jet openings, repeated reciprocation of the piston of cylinder 16 will cause the liquid reactant to flow first into the cylinder and then to be recirculated back to the supply vessel. This recirculation can be helpful to equalize temperatures before beginning operation of the machine and to keep the reactant liquids well dispersed. Reactant tank 43 is connected to cylinder 17 and nozzle jet 41 in the identical manner.

Valve 51, and the valves controlling introduction of fluid to power cylinder 20 and ram cylinder 37, are preferably solenoid controlled for automatic operation.

Reactant cylinders 16 and 17 are preferably adapted to be fitted with replaceable liner sleeves 54 and 55, respectively, (FIG. 3) and corresponding replaceable pistons for coarse adjustment of the stoichiometric ratio. Coarse control can also be accomplished by changing to cylinders of different volumes, or coarse control can be accomplished by use of cylinder rods, as shown in FIG. 7.

Referring to FIG. 7, piston 58 is connected to piston rod 18A of cylinder 16A. A plurality of rods 56 and 57, threaded on one end, extend through appropriate sealed apertures in the cylinder end wall and engage threaded sockets in the face of the piston. The apertures are sealed, for example, by resilient O-rings. The rods travel with the piston. The volume of reactant contained in the cylinder can be varied by adding or removing rods. Of course, if a rod is removed, then its opening in the end wall must be sealed, as by a plug. A non-reactive oil, such as a DOP oil, is preferably fed into the back ports of the reactant cylinders 16 and 17, as through tube 59, to prevent air bubbles from penetrating into the reactant around the piston edge.

An impingement mixer is believed to mix through the turbulence caused by the direct collision of two or more streams. Although impingement mixing is commercially important, few studies have been made to determine the criteria required for good mixing. Previous studies have attempted to correlate the area and momentum ratios of the impinging streams, mixing chamber geometry, nozzle length to diameter ratio, and nozzle Reynolds number with mixing quality. From studies made in connection with the present invention, only the Reynolds numbers of the impinging streams appear to be of primary importance.

The Reynolds number defines the ratio of the momentum of a stream to viscous effects caused by the viscous drag on the wall of the impingement jets or orifices. The liquids coming out of the orifices have some inertial momentum due to their velocities. They also have a viscosity and are dragging on the walls of the orifices as they try to come out. Specifically the nozzle Reynolds number is defined as $$N_{Re} = \frac{\bar{\rho}vD}{\eta}$$

where
$\rho$ = fluid density
$\eta$ = fluid viscosity
$v$ = average velocity of the fluid stream as it leaves the nozzle
= volume of flow rate through the nozzle divided by nozzle cross sectional area
D = hydraulic diameter
= diameter for a cylindrical nozzle
= four times the nozzle cross sectional area divided by wetted perimeter for other cross sectional shapes. Units of these quantities are chosen such that $N_{Re}$ is dimensionless. It has been determined that the nozzle Reynolds number should be at least about 120 to obtain good mixing and complete conversion of reactants to polymer. This critical Reynolds number can increase from about 120 to about 250 for very fast reacting systems where half of the reaction occurs in less than 10 seconds. The viscosity and density are fixed by the nature and temperature of the particular reactant liquids employed. The hydraulic diameter of the nozzle is fixed for a given design. Thus the minimum flow rate for good mixing is determined by the Reynolds number. Of lesser importance are such factors as the ratio of the orifice size to the chamber size, the angle of impingement and the ratio of the momentum of one side of the chamber to the other. The diameter of the chamber divided by the diameter of the orifice should be between about 2 to 7.

The present invention offers a self-contained machine of simple design for metering, mixing and dispensing under pressure two or more components which react together to produce a high polymer. Continuous ratio control is provided through the lever arm system and movable fulcrum point. Coarse changes in ratio may be accomplished by changing the cylinder diameter or by adding rods to the reactant fluid sides of the cylinders. Driving force is provided by a single power cylinder. The machine has a simple integral ram-type self-cleaning impingement mix head. Short connecting lines and stiff mechanical system reduce lead-lag problems. Commercially available cylinders may be used for metering components, reducing costs. Non-reactive oil may be utilized on the back sides of the reactant cylinders to improve seal and prevent air entrainment and degradation of reactants. The machine is adaptable to simple automatic timing and control such as momentary delay between power activation and opening of mixing head to reduce lead-lag problems, shot time control, shot volume control, recirculation, and the like.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A machine for metering and mixing at least two liquids which are reactive to form a polymer, said machine comprising:
   (A) a plurality of vessels for separately containing reactive liquids,
   (B) a plurality of reactant metering cylinders, said metering cylinders being in substantially parallel side-by-side relation,
   (C) duct means connecting each of said vessels to one of said metering cylinders,
   (D) a reciprocable piston in each of said metering cylinders,
   (E) means for reciprocating said pistons together in the same direction, said means comprising:
     (1) a power means for actuating the piston of one of said metering cylinders,
     (2) a lever arm pivotally connected at one end to the piston of said first metering cylinder and the power means,
     (3) a movable fulcrum pivotally engaging a first slot in said lever arm spaced from the connection of the lever arm to the first metering cylinder piston, and
     (4) a further slotted pivotal connection between said lever arm and the piston of the other of said metering cylinders, said slotted pivotal connection lying between said fulcrum and the pivotal connection to said first metering cylinder,
   (F) a mixing head, and (G) duct means connecting said mixing head to each of said metering cylinders.

2. A machine according to claim 1 wherein a valve is disposed in the duct means between each of said vessels and each of said metering cylinders.

3. A machine according to claim 1 wherein said power means is a fluid actuated power cylinder in substantially longitudinal alignment with the first of said metering cylinders.

4. A machine according to claim 1 wherein said mixing head comprises:
(A) a longitudinal passageway,
(B) a closely fitting ram reciprocable in said passageway,
(C) a plurality of nozzle openings into said passageway,
 (1) said opening being spaced oppositely with their longitudinal axes intersecting within the passageway,
 (2) each of said openings being connected by duct means to one of said metering cylinders.

5. A machine according to claim 4 wherein the flow from each of said nozzles is characterized by a Reynolds number at least about 120.

6. A machine according to claim 4 wherein a further fluid actuated power cylinder is disposed in longitudinal alignment with said ram, the piston of said further cylinder being connected to said ram.

7. A machine according to claim 1 wherein:
(A) further duct means connect said mixing head with said vessels, and
(B) a valve is disposed in said further duct means.

8. A machine according to claim 1 wherein:
(A) said power cylinder and metering cylinders are supported on a frame,
(B) said first slot in said lever arm is elongated,
(C) said movable fulcrum comprises a vertical pin engaging said elongated slot in the lever arm,
(D) said pin is fixedly secured to a slidable plate, and
(E) said plate is slidable relative to said frame.

9. A machine according to claim 1 wherein at least one of said metering cylinders is provided with a removable cylindrical liner sleeve and the diameter of the piston of said cylinder corresponds to the inside diameter of said sleeve.

10. A machine for metering and mixing at least two liquids which are reactive to form a polymer, said machine comprising:
(A) a plurality of vessels for separately containing reactive liquids,
(B) a plurality of reactant metering cylinders,
(C) duct means connecting each of said vessels to one of said metering cylinders,
(D) a reciprocable piston in each of said metering cylinders,
(E) at least one removable rod extending through a sealed aperture in the cylinder end wall of at least one of said metering cylinders and engaging the piston of said cylinder to be movable therewith,
(F) means for reciprocating said pistons together, said means comprising:
 (1) a power means for actuating the piston of one of said metering cylinders,
 (2) a lever arm pivotally connected at one end to the piston of said first metering cylinder and the power means,
 (3) a movable fulcrum pivotally engaging a slot in said lever arm spaced from the connection of the lever arm to the first metering cylinder piston, and
 (4) a further slotted pivotal connection between said lever arm and the piston of the other of said metering cylinders,
(G) a mixing head, and
(H) duct means connecting said mixing head to each of said metering cylinders.

* * * * *